United States Patent
Prestayko et al.

(10) Patent No.: US 10,186,344 B2
(45) Date of Patent: Jan. 22, 2019

(54) CONDUCTIVE POLYMER COMPOSITE

(71) Applicant: XEROX CORPORATION, Norwalk, CT (US)

(72) Inventors: Rachel Prestayko, Hamilton (CA); Sarah J. Vella, Milton (CA); Carolyn Moorlag, Mississauga (CA); Barkev Keoshkerian, Thornhill (CA)

(73) Assignee: XEROX CORPORATION, Norwalk, CT (US)

( * ) Notice: Subject to any disclaimer, the term of this patent is extended or adjusted under 35 U.S.C. 154(b) by 255 days.

(21) Appl. No.: 15/000,554

(22) Filed: Jan. 19, 2016

(65) Prior Publication Data

US 2017/0206999 A1 Jul. 20, 2017

(51) Int. Cl.
| | |
|---|---|
| *H01B 1/02* | (2006.01) |
| *H01B 1/24* | (2006.01) |
| *B29C 64/106* | (2017.01) |
| *B29C 64/40* | (2017.01) |
| *B33Y 10/00* | (2015.01) |
| *B33Y 70/00* | (2015.01) |
| *B29K 67/00* | (2006.01) |
| *B29K 105/16* | (2006.01) |
| *B29K 507/04* | (2006.01) |

(52) U.S. Cl.
CPC ............ *H01B 1/24* (2013.01); *B29C 64/106* (2017.08); *B29C 64/40* (2017.08); *B29K 2067/04* (2013.01); *B29K 2105/167* (2013.01); *B29K 2507/04* (2013.01); *B29K 2995/0005* (2013.01); *B33Y 10/00* (2014.12); *B33Y 70/00* (2014.12)

(58) Field of Classification Search
None
See application file for complete search history.

(56) References Cited

U.S. PATENT DOCUMENTS

| | | | |
|---|---|---|---|
| 4,769,177 A * | 9/1988 | Hocker et al. | |
| 5,789,680 A | 8/1998 | Fujimoto | |
| 7,925,454 B1 | 4/2011 | Narcus | |
| 8,865,604 B2 | 10/2014 | Wasynczuk | |
| 2004/0016912 A1* | 1/2004 | Bandyopadhyay et al. | |
| 2011/0028678 A1* | 2/2011 | Matsuzono et al. | |
| 2011/0260116 A1 | 10/2011 | Plee et al. | |
| 2012/0024353 A1 | 2/2012 | Ge et al. | |
| 2012/0247808 A1 | 10/2012 | Lam | |
| 2015/0123043 A1 | 5/2015 | Nagamune et al. | |
| 2016/0198576 A1 | 7/2016 | Lewis et al. | |
| 2017/0129182 A1 | 5/2017 | Sauti et al. | |
| 2017/0151704 A1 | 6/2017 | Go et al. | |
| 2017/0207001 A1 | 7/2017 | Vella et al. | |
| 2017/0267532 A1 | 9/2017 | Liu | |
| 2017/0297262 A1 | 10/2017 | Grigorian | |
| 2017/0346129 A1 | 11/2017 | Stolyarov et al. | |
| 2018/0049655 A1 | 2/2018 | Melnykowycz et al. | |

FOREIGN PATENT DOCUMENTS

| | | |
|---|---|---|
| CA | 2915409 A1 | 12/2014 |
| EP | 2 489 442 A1 | 8/2012 |

OTHER PUBLICATIONS

Prestayko et al., "Conductive Polymer Composite," U.S. Appl. No. 15/044,456, filed Feb. 16, 2016.
Prestayko et al., "Conductive Polymer Composite," U.S. Appl. No. 15/000,588, filed Jan. 19, 2016.
Moorlag et al., "3D Conductive Compositions Anticipating or Indicating Structural Compromise," U.S. Appl. No. 15/090,259, filed Apr. 4, 2016.
Chun et al., "High Conductive, Printable and Stretchable Composite Films of Carbon Nanotubes and Silver," Nature Nanotechnology, vol. 5, 2010, 853-857.
Office Action dated Mar. 2, 2018 issued in related Canadian Application No. 2,957,114.

* cited by examiner

*Primary Examiner* — Robert T Butcher
(74) *Attorney, Agent, or Firm* — MH2 Technology Law Group LLP

(57) ABSTRACT

A conductive polymer composite is disclosed. The composite comprises a thermoplastic polymer; carbon nanotubes; at least one electron donor molecule and at least one electron acceptor molecule. A method of three-dimensional printing using the conductive polymer composite and a conductive polymer composite filament are also disclosed.

19 Claims, 2 Drawing Sheets

CONDUCTIVE POLYMER COMPOSITE

DETAILED DESCRIPTION

Field of the Disclosure

The present disclosure is directed to a conductive polymer composite.

Background

Additive manufacturing (also known as three dimensional printing) as practiced in industry has been, to date, mostly concerned with printing structural features. There is a need for materials and processes that integrate functional properties (such as electronic features) into additive manufacturing. Recently, conductive materials that are potentially useful in additive manufacturing have been commercialized, but their conductivities are generally low, ranging from ~$10^{-3}$ S/cm to upwards of ~2.0 S/cm. The mechanical properties of the commercially available materials, particularly the conductive materials such as Acrylonitrile butadiene styrene (ABS) or polylactic acid (PLA), are generally limited (e.g., are not flexible and/or are fairly brittle), which limits use as a conductive component.

There is great interest in the field of additive manufacturing to develop improved materials that can be used to easily print completely integrated functional objects with limited post-assembly. This would allow completely new designs in the manufacturing and consumption of everyday objects, particularly when they can be enabled with conductive materials. The capability of printing conductive components within an object can provide the potential for embedded sensors and electronics.

Common techniques in additive manufacturing utilize the extrusion of molten polymer through a heated nozzle. This method is used in, for example, fused deposition modeling (FDM), where a filament is fed into a hot zone for continuous extrusion. The molten polymer can be deposited layer by layer onto a build plate in order to form 3D objects. There are very few filament materials currently on the market which exhibit electrical conductivity, and those which are available have relatively low conductivities, which limits the range of potential applications. The materials are typically constructed such that one conductive material forms a percolating network through an insulating polymer base, such that electrons have a continuous pathway to flow. The formation of this conductive network is limited to the way the conductive particles are arranged within the polymer base. Although these materials have been extensively explored in both academia and industry, the focus is typically on minimizing the amount of conductive additive required to form a percolating network, where the conductivity is relatively low.

Novel plastic composite materials that exhibit increased conductivity would be a welcome step forward in the art, and could have significant impacts in the field of additive manufacturing.

SUMMARY

An embodiment of the present disclosure is directed to a conductive polymer composite. The composite comprises a thermoplastic polymer; carbon nanotubes; at least one electron donor molecule and at least one electron acceptor molecule.

Another embodiment of the present disclosure is directed to a method of three dimensional printing. The method comprises providing a composite to a three-dimensional printer, the composite comprising a thermoplastic polymer, carbon nanotubes, at least one electron donor molecule and at least one electron acceptor molecule. The composite is heated and the heated composite is extruded onto a build platform to form a three dimensional object.

Yet another embodiment of the present disclosure is directed to a conductive polymer composite filament. The filament comprises a thermoplastic polymer; carbon nanotubes; at least one electron donor molecule and at least one electron acceptor molecule.

The compositions of the present application exhibit one or more of the following advantages: improved conductivity of filaments for 3D printing applications, such as fused deposition modeling (FDM), and improved 3D printing processability.

It is to be understood that both the foregoing general description and the following detailed description are exemplary and explanatory only and are not restrictive of the present teachings, as claimed.

BRIEF DESCRIPTION OF THE DRAWINGS

The accompanying drawings, which are incorporated in and constitute a part of this specification, illustrates embodiments of the present teachings and together with the description, serve to explain the principles of the present teachings.

Figure 1:
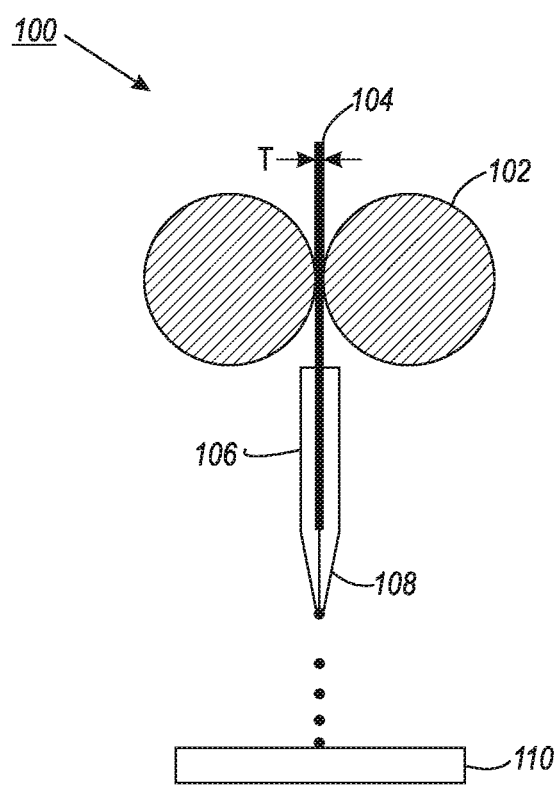
FIG. 1 illustrates a three-dimensional printer employing a filament made with the compositions of the present disclosure.

It should be noted that some details of the figure have been simplified and are drawn to facilitate understanding of the embodiments rather than to maintain strict structural accuracy, detail, and scale.

DESCRIPTION OF THE EMBODIMENTS

Reference will now be made in detail to embodiments of the present teachings, examples of which are illustrated in the accompanying drawings. In the drawings, like reference numerals have been used throughout to designate identical elements. In the following description, reference is made to the accompanying drawings that form a part thereof, and in which is shown by way of illustration specific exemplary embodiments in which the present teachings may be practiced. The following description is, therefore, merely exemplary.

An embodiment of the present disclosure is directed to a conductive polymer composite. The composite comprises a thermoplastic polymer, carbon nanotubes, at least one electron donor molecule and at least one electron acceptor molecule.

Any suitable thermoplastic polymer useful in three dimensional printing can be employed in the composites of the present disclosure. The composite can include a single polymer or mixtures of thermoplastic polymers, including mixtures of any of the thermoplastic polymers disclosed herein. In an embodiment, the thermoplastic polymer comprises at least one repeating unit selected from the group consisting of acrylate units, carboxylic acid ester units, amide units, lactic acid units, benzimidazole units, carbonate ester units, ether units, sulfone units, arylketone units, arylether units, etherimide units, ethylene units, phenylene oxide units, propylene units, styrene units, vinyl halide units and carbamate units. In an embodiment, the thermoplastic polymer is a copolymer, such as a block copolymer, of two or more of any of the above listed repeating units. As an example, the thermoplastic polymer can comprise at least one polymer selected from the group consisting of polyacrylates, polybenzimidazoles, polycarbonates, polyether sulfones, polyaryl ether ketones such as polyether ether ketone, polyetherimide, polyethylenes such as polyethylene and poly(ethylene-co-vinylacetate), polyphenylene oxides, polypropylenes such as polypropylene and Poly(vinylidene fluoride-co-hexafluoropropylene), polystyrenes such as polystyrene, poly(styrene isoprene styrene), acrylonitrile butadiene styrene (ABS) and poly(Styrene Ethylene Butylene Styrene) (SEBS), polyesters such as polyethylene terephthalate, polylactic acid (PLA) and polycaprolactone, polyurethanes, polyamides such as nylon, Poly(vinylidene fluoride) (PVDF) and polyvinyl chlorides. In an embodiment, the thermoplastic polymer does not include Acrylonitrile butadiene styrene (ABS) or PLA.

In an embodiment, the thermoplastic polymer is a selected from the group consisting of polyacrylates and copolymer of acrylates, such as block copolymers of acrylates. The acrylate copolymers can comprise at least one acrylate monomer and optionally one or more additional monomers such as any of those monomers listed above for use in the thermoplastic polymers. Such polymers can be formulated to have a desired degree of flexibility. In an embodiment, the polymer can be a polyester, such as polycaprolactone.

The thermoplastic polymer can be included in the composite in any suitable amount that will allow the composite to function in a three dimensional printing process. Examples of suitable amounts include a range of from about 10% to about 90% by weight, such as about 40% to about 80%, or about 40% to about 70%, relative to the total weight of the conductive polymer composite.

The composites can include carbon nanotubes, electron donor molecules and electron acceptor molecules in any suitable amount that will provide the desired conductivity. Example amounts of carbon nanotubes include a range of from about 1% to about 40% by weight, such as about 2% to about 20% or about 5% to about 15%, relative to the total weight of the conductive polymer composite. Larger amounts of carbon nanotubes may reduce processability of the composition by a 3D printer, depending, on among other things, the type of thermoplastic and the printing process employed. Thus, in an embodiment, carbon nanotube concentrations of 20% by weight or less, such as 10% by weight or less, may be preferred. Example amounts of electron donor molecules include a range of from about 0.5% to about 50% by weight, such as about 5% to about 45% or about 10% to about 40% or about 15% to about 30%, relative to the total weight of the conductive polymer composite. Example amounts of electron acceptor molecules include a range of about 0.1% to about 10% by weight, such as about 0.2% to about 5% or about 0.3% to about 2%, relative to the total weight of the conductive polymer composite.

Any suitable carbon nanotubes can be employed. Examples of suitable carbon nanotubes include single walled carbon nanotubes, multi-walled carbon nanotubes and mixtures thereof. In an embodiment, the carbon nanotubes are multi-walled carbon nanotubes. Commercially available sources of carbon nanotubes include, for example, carbon nanotubes available from CHEAPTUBES™ or NANOCYL™, such as Nanocyl 7000.

The electron donor molecules and electron acceptor molecules can form a charge transfer complex that, in combination with the carbon nanotubes, enhances the electrical conductivity of the thermoplastic composition. Any suitable type of electron donors and electron acceptors can be employed. In an embodiment, the electron donors can be small molecule semiconductors. Examples of suitable electron donors include tertiary arylamines, benzidine and their derivatives, such as N,N'-diphenyl-N,N'-bis(alkylphenyl)-1,1-biphenyl-4,4'-diamine or N,N'-bis(4-methylphenyl)-N,N-bis(4-ethylphenyl)-[1,1'-(3,3'-dimethyl)biphenyl]4,4'-diamine, or combinations thereof, where derivatives can include, for example, the replacement of hydrogen atoms on one or more of the phenyl rings of the tertiary arylamines or benzidine with halides, amines, aldehydes, ethers, boronic acids or additional phenyl rings as long as the derivative maintains conjugated structure and acts as an electron donor. In an embodiment, the at least one electron acceptor is a dopant selected from the group consisting of tetracyanoquinodimethane (TCNQ), tetracyanoethylene (TCNE) or quinones and their derivatives, and combinations thereof, where the derivatives can include, for example, the replacement of hydrogen atoms on the TCNQ, TCNE or quinones with other atoms or radicals, such as chlorine atoms, hydroxyl radicals, cyano radicals or any other suitable radical, as long as the derivative remains conjugated and acts as an electron acceptor.

The conductive polymer composites of the present disclosure can include any other suitable optional ingredients in any desired amounts, such as carrier liquids, plasticizers and other such components to manage flow in thermoplastic processing, dispersants and surfactants. Ingredients not expressly recited in the present disclosure can be limited and/or excluded from the conductive polymer composites disclosed herein. Thus, the amounts of the thermoplastic polymer, carbon nanotubes, electron donor and electron acceptor, with or without the optional ingredients as recited herein, can add up to 90% to 100% by weight of the total ingredients employed in the composites of the present disclosure, such as 95% to 100% by weight, or 98% to 100% by weight, or 99% to 100% by weight, or 100% by weight of the total ingredients.

The composite of the present disclosure can be in any suitable form. In an embodiment, the composite is a conductive paste. The paste can be a paste at room temperature or a material that needs to be heated in order to flow like a paste. In an embodiment, the paste comprises at least one carrier liquid. In an embodiment, the carrier liquid may be a solvent capable of dissolving one or more of the paste ingredients. In another embodiment, the carrier liquid is not a solvent. Suitable carrier liquids for the paste include, for example, toluene, pyrrolidones (e.g. N-methylpyrrolidone, 1-cyclohexyl-2-pyrrolidone), N,N-dimethylformamide (DMF), N,N-dimethylacetamide dimethylsulfoxide and hexamethylphosphoramide. The carrier liquid can be included in the paste in any suitable amount, such as, for example, about 0.5% to about 60% weight percent based on the total weight of the wet composite paste. Optional additives that can be included in the paste are, for example, dispersants, surfactants, other solvents in addition to the carrier liquid and other conductive additives.

In an alternative embodiment, the composite can be in the form of a dry composite having less than 5% liquid carrier, such as less than 3%, 2% or 1 liquid carrier by weight relative to the total weight of the dry composite, such as no liquid carrier. The dry composite can be formed using solvent, which is then removed by any suitable method, such as by heating, vacuum and/or other liquid removal techniques. Alternatively, the composite can be made without carrier liquid or solvent using neat processing techniques.

The composite has a bulk conductivity greater than 0.7 S/cm, such as greater than 0.8 S/cm. Bulk conductivity is calculated using the formula, $$\sigma = L/(R*A) \quad (1)$$

Where:
σ is bulk electrical conductivity;
L is length of the filament;
R is measured resistance of an extruded filament;
A is the cross-sectional area ($\pi r^2$) of the filament, where r is the radius of the filament.

The resistance, R, can be measured by forming an extruded filament made from the composite. The tips of the filament are painted with silver to provide good electrical connections with the testing equipment, but would not necessarily be painted if the filaments were to be used in additive manufacturing. Resistance can then be measured across the length of the filament. The dimensions of the filament and the measured value for R can then be used to calculate bulk conductivity (σ) of the composite.

The composites of the present disclosure can be made by any suitable method. For example, the thermoplastic polymer can be combined with the carbon nanotubes, electron donor and electron acceptor using melt mixing techniques. Other suitable techniques for mixing such compositions are well known in the art.

The present disclosure is also directed to a method of three dimensional printing. Any type of three dimensional printing can be employed, such as filament printing (e.g., FDM) or paste extrusion. The method includes providing any of the conductive polymer composites of the present disclosure to a three dimensional printer. The composite can be in any suitable form useful in three dimensional printing, such as a filament or paste. The conductive polymer can be heated to a molten state suitable for extrusion. Then the heated conductive polymer is extruded onto a substrate to form a three dimensional object.

The conductive polymer composites of the present disclosure can be used in a FDM process by first forming the composite into a filament having a desired shape and dimensions (e.g., by extrusion or any other suitable process). The filament can have any suitable shape that will allow the filament to be loaded into a 3 D FDM printer and printed. The filament, as initially supplied, can have a continuous length that is much longer than its thickness, T, (shown in FIG. 1) such as a ratio of length to thickness that is greater than 100 to 1, such as greater than 500 to 1 or 1000 to 1 or more, where T is the smallest thickness dimension of the filament (e.g., the diameter if the filament has a circular cross-section). Any suitable thickness can be used, and may depend on the 3D printer being used. As an example, thicknesses can range from about 0.1 mm to about 10 mm, such as about 0.5 mm to about 5 mm, or about 1 mm to about 3 mm.

An example of a three dimensional printer 100 employing a filament of the present disclosure is shown in FIG. 1. The three dimensional printer 100 includes a feeder mechanism 102 for supplying the filament 104 to a liquifier 106. The liquifier 106 melts the filament 104 and the resulting molten plastic is extruded through a nozzle 108 and deposited on a build platform 110. The feeder mechanism 102 can comprise rollers or any other suitable mechanism capable of supplying the filament 104 from, for example, a spool of filament (not shown). The liquifier 106 can employ any technique for heating the filament, such as heating elements, lasers and so forth. The three dimensional printer 100 as shown in FIG. 1 is exemplary only and any type of three dimensional printer can be employed to deposit the filaments of the present disclosure.

EXAMPLES

Example 1

Conductive polymer composites were prepared by melt mixing a polymer base (Polycaprolactone) with conductive additives, which included 22% by weight of an electron donor molecule (N,N'-diphenyl-N,N'-bis(alkylphenyl)-1,1-biphenyl-4,4'-diamine, also referred to as mTBD), 0.4% by weight of an electron acceptor molecule (tetracyanoquinodimethane, also referred to as TCNQ) and 11% by weight of multi-walled carbon nanotubes (MWNT) on a twin-screw extruder for 30 minutes at 30 rpm. The resulting material was cryogenically ground and the ground composite was extruded into a filament using a Melt Flow Indexer (MFI) and a modified die. The conditions for extrusion on the MFI included a 1.8 mm orifice and 16.96 kg weight (the weight on the MFI provides the force for extrusion) in order to prepare the final filament. The final filament had a diameter of about 1.75 mm.

Example 2

A 10 cm section of the extruded filament of Example 1, with ends painted in silver paint, were used to measure resistance in order to calculate bulk conductivity. Resistance measurements were completed using a digital multimeter. Bulk conductivity was 0.89 S/cm, as calculated using formula 1 above.

Comparative Example A

A composite similar to that of Example 1 was made, but with 10% by weight of MWNT and 30% by weight of mTBD, (no acceptor dopant was added).

Comparative Example B

A composite similar to that of Example 1 was made, but without the multi-walled carbon nanotubes.

Comparative Example C

A composite similar to that of Example 1 was made, but with 35% by weight mTBD and without the multi-walled carbon nanotubes or the acceptor dopant.

Comparative Example D

A composite similar to that of Example 1 was made, but with 10% by weight MWNT and without the small molecule semiconductor or the acceptor dopant.

Figure 2:
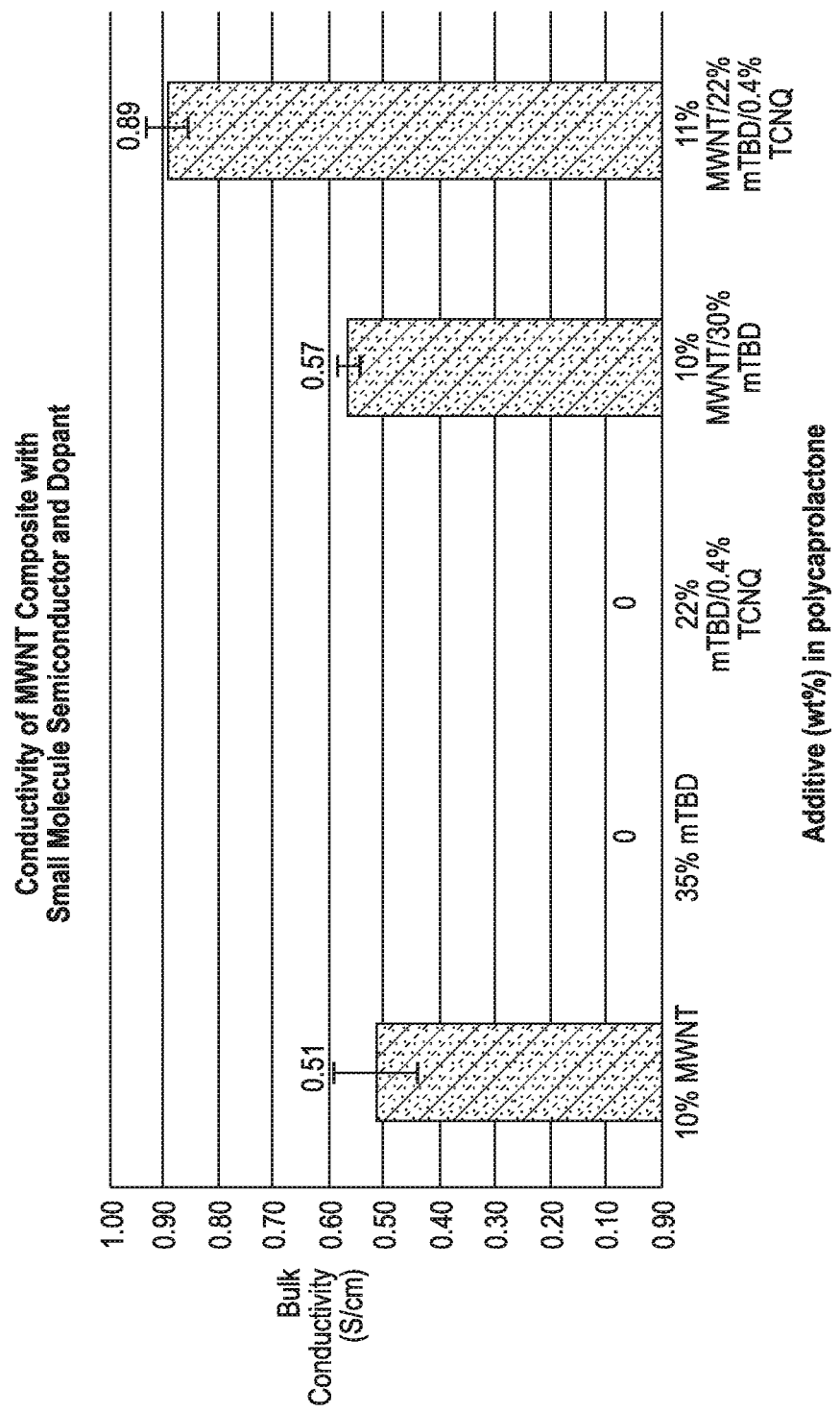
FIG. 2 shows a synergistic effect of a thermoplastic material comprising carbon nanotubes, an electron donor and an electron acceptor, according to an example of the present disclosure.

Bulk conductivity was measured for each of the Comparative Example compositions A to D, similarly as described in Example 2. Results are shown in FIG. 2. From the results, it was evident that the electron donor molecule N,N'-diphenyl-N,N'-bis(alkylphenyl)-1,1-biphenyl-4,4'-diamine (mTBD), electron acceptor molecule tetracyanoquinodimethane (TCNQ) and MWNT had a synergistic effect when combined with one another in a plastic composite. The electron donor molecule, mTBD, did not form a conductive composite in the absence of MWNT, either with or without the electron acceptor molecule (Comparative Examples B and C). Also, no significant increase in conductivity was observed when mTBD and MWNT were combined (Comparative Example A). In the presence of all three additive components (mTBD, TCNQ and MWNT) a relatively large increase in conductivity was observed that was greater than the additive effect that would be expected from results of the mTBD, TCNQ and MWNT alone, as shown in FIG. 1. Thus, the data of FIG. 1 shows a synergistic effect of multi-walled carbon nanotubes with the charge transfer complex. While exhibiting improved electrical conductivity, the material retains its processability and applicability for additive manufacturing (also referred to as 3D printing).

Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein.

While the present teachings have been illustrated with respect to one or more implementations, alterations and/or modifications can be made to the illustrated examples without departing from the spirit and scope of the appended claims. In addition, while a particular feature of the present teachings may have been disclosed with respect to only one of several implementations, such feature may be combined with one or more other features of the other implementations as may be desired and advantageous for any given or particular function. Furthermore, to the extent that the terms "including," "includes," "having," "has," "with," or variants thereof are used in either the detailed description and the claims, such terms are intended to be inclusive in a manner similar to the term "comprising." Further, in the discussion and claims herein, the term "about" indicates that the value listed may be somewhat altered, as long as the alteration does not result in nonconformance of the process or structure to the illustrated embodiment. Finally, "exemplary" indicates the description is used as an example, rather than implying that it is an ideal.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompasses by the following claims.

What is claimed is:

1. A conductive polymer composite, comprising:
a thermoplastic polymer;
carbon nanotubes;
at least one electron donor molecule selected from the group consisting of benzidine, conjugated derivatives of benzidine, N,N'-diphenyl-N,N'-bis(alkylphenyl)-1,1-biphenyl-4,4'-diamine and N,N'-bis(4-methylphenyl)-N,N'-bis(4-ethylphenyl)-[1,1'-(3,3'dimethyl)biphenyl]4,4'-diamine; and
at least one electron acceptor molecule.

2. The composite of claim 1, wherein the thermoplastic polymer comprises at least one repeating unit selected from the group consisting of acrylate units, carboxylic acid ester units, amide units, lactic acid units, benzimidazole units, carbonate ester units, ether units, sulfone units, arylketone units, arylether units, arylalkyl units, etherimide units, ethylene units, phenylene oxide units, propylene units, styrene units, vinyl halide units and carbamate units.

3. The composite of claim 2, wherein the thermoplastic polymer is a copolymer of two or more of the repeating units.

4. The composite of claim 3, wherein the copolymer comprises one or more acrylate units.

5. The composite of claim 1, wherein the thermoplastic polymer comprises at least one polymer selected from the group consisting of polyacrylates, polybenzimidazoles, polycarbonates, polyether sulfones, polyaryl ether ketones, polyethylenes, polyphenylene oxides, polypropylenes, polystyrenes, polyesters, polyurethanes, polyamides, Poly(vinylidene fluoride) (PVDF) and polyvinyl chlorides, polyether ether ketone, poly(ethylene-co-vinylacetate), polyetherimide, polypropylene, Poly(vinylidene fluoride-co-hexafluoropropylene), poly(styrene isoprene styrene), acrylonitrile butadiene styrene (ABS), poly(Styrene Ethylene Butylene Styrene) (SEBS), polyethylene terephthalate, polylactic acid (PLA), polycaprolactone and nylon.

6. The composite of claim 1, wherein the thermoplastic polymer is in an amount ranging from about 10% to about 90% by weight, relative to the total weight of the conductive polymer composite.

7. The composite of claim 1, wherein the carbon nanotubes are multi-walled carbon nanotubes.

8. The composite of claim 1, wherein the carbon nanotubes are in an amount ranging from about 1% to about 40% by weight, relative to the total weight of the conductive polymer composite.

9. The composite of claim 1, wherein the at least one electron donor molecule is selected from the group consisting of N,N'-diphenyl-N,N'-bis(alkylphenyl)-1,1-biphenyl-4,4'-diamine and N,N'-bis(4-methylphenyl)-N,N'-bis(4-ethylphenyl)-[1,1'-(3,3'-dimethyl)biphenyl]4,4'-diamine.

10. The composite of claim 1, wherein the at least one electron donor molecule is in an amount ranging from about 0.5% to about 50% by weight, relative to the total weight of the conductive polymer composite.

11. The composite of claim 1, wherein the at least one electron acceptor molecule is selected from the group consisting of tetracyanoquinodimethane (TCNQ) and conjugated derivatives thereof, tetracyanoethylene (TCNE) and conjugated derivatives thereof, quinones and conjugated derivatives thereof.

12. The composite of claim 1, wherein the at least one electron acceptor molecule is tetracyanoquinodimethane.

13. The composite of claim 1, wherein the electron acceptor molecule is in an amount ranging from about 0.1% to about 10% by weight, relative to the total weight of the conductive polymer composite.

14. The composite of claim 1, wherein the composite has a bulk conductivity greater than 0.7 S/cm, where the conductivity is calculated using the formula $\sigma = L/(R*A)$, based on the measured resistance (R) of an extruded filament made from the composite and having silver painted tips, the filament having a length (L) of 10 cm and a diameter of 1.75 mm.

15. A method of three dimensional printing, the method comprising:
providing a composite to a three-dimensional printer, the composite comprising a thermoplastic polymer, carbon nanotubes, at least one electron donor molecule and at least one electron acceptor molecule, the at least one electron donor molecule being selected from the group consisting of benzidine, conjugated derivatives of benzidine, N,N'-diphenyl-N,N'-bis(alkylphenyl)-1,1-biphenyl-4,4'-diamine and N,N'-bis(4-methylphenyl)-N,N'-bis(4-ethylphenyl)-[1,1'-(3,3'-dimethyl)biphenyl]4,4'-diamine;

heating the composite; and extruding the heated composite onto a build platform to form a three dimensional object.

16. The method of claim 15, wherein the heated composite is in the form of a filament.

17. A conductive polymer composite filament, comprising:
a thermoplastic polymer;
carbon nanotubes;
at least one electron donor molecule selected from the group consisting of benzidine, conjugated derivatives of benzidine, N,N'-diphenyl-N,N'-bis(alkylphenyl)-1,1-biphenyl-4,4'-diamine and N,N'-bis(4-methylphenyl)-N,N'-bis(4-ethylphenyl)-[1,1'-(3,3'-dimethyl)biphenyl]4,4'-diamine; and
at least one electron acceptor molecule.

18. The conductive polymer composite filament of claim 17, wherein the thermoplastic polymer comprises at least one polymer selected from the group consisting of polyacrylates, polybenzimidazoles, polycarbonates, polyether sulfones, polyaryl ether ketones, polyethylenes, polyphenylene oxides, polypropylenes, polystyrenes, polyesters, polyurethanes, polyamides, Poly(vinylidene fluoride) (PVDF) and polyvinyl chlorides, polyether ether ketone, poly(ethylene-co-vinylacetate), polyetherimide, polypropylene, Poly(vinylidene fluoride-co-hexafluoropropylene), poly(styrene isoprene styrene), acrylonitrile butadiene styrene (ABS), poly(Styrene Ethylene Butylene Styrene) (SEBS), polyethylene terephthalate, polylactic acid (PLA), polycaprolactone and nylon.

19. The conductive polymer composite filament of claim 17, wherein the at least one electron acceptor molecule is selected from the group consisting of tetracyanoquinodimethane (TCNQ) and conjugated derivatives thereof, tetracyanoethylene (TCNE) and conjugated derivatives thereof, quinones and conjugated derivatives thereof.

* * * * *